Jan. 12, 1960 F. H. FOWLER, JR 2,921,190
SERIAL COINCIDENCE DETECTOR
Filed Aug. 23, 1954
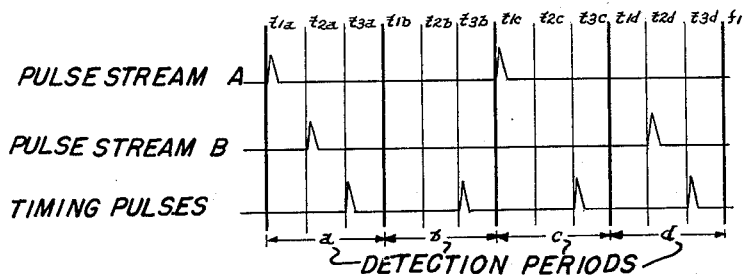
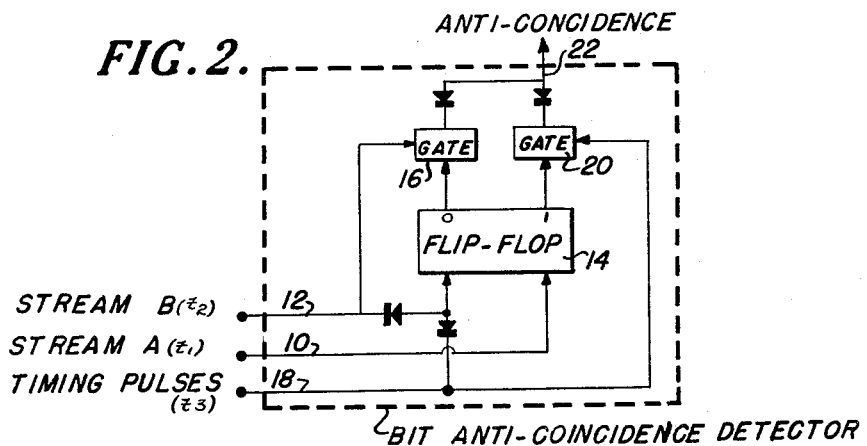
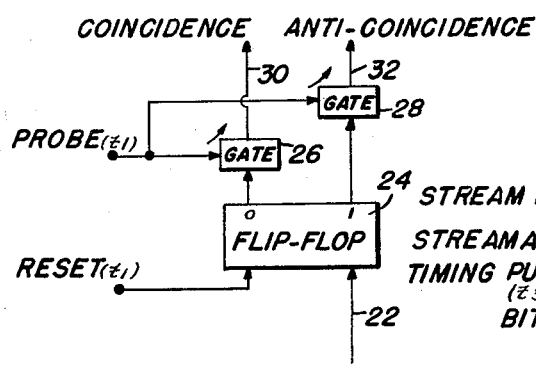
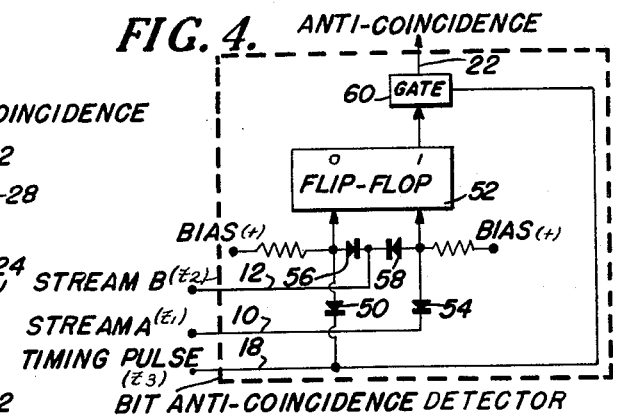
INVENTOR
FRANKLIN H. FOWLER, JR.
BY Cushman, Darby & Cushman
ATTORNEYS United States Patent Office 2,921,190
Patented Jan. 12, 1960

2,921,190

SERIAL COINCIDENCE DETECTOR

Franklin H. Fowler, Jr., Washington, D.C., assignor, by mesne assignments, to Sperry Rand Corporation, New York, N.Y., a corporation of Delaware Application August 23, 1954, Serial No. 451,618

14 Claims. (Cl. 250—27)

This invention relates to comparison circuits and methods and particularly to circuits and methods for detecting coincidence or anticoincidence between signals or chains of signals on a pair of input lines.

In electronic data handling and control equipment, it is often necessary to employ circuits responsive only to the coincidence or to the anticoincidence of pulses on a pair of signal lines to energize a common output line. In certain cases it is desirable to energize the output line each time a coincidence or anticoincidence be produced only after the passage of a predetermined time or after the comparison of a predetermined number of signal pairs.

This invention concerns itself with an improved coincidence or anticoincidence detecting circuit for use in electronic systems. It is characterized by its economical construction, especially in regard to the use of circuit components which are standard in the electronic computer art. The great size and complexity of computing systems make it highly desirable to achieve unitary construction, as has been done here, and thereby reduce both initial and repair costs.

Accordingly, it is one object of this invention to provide novel coincidence detecting methods and circuits.

Another object of this invention is to provide a coincidence detecting circuit which is constructed of a minimum number of vacuum tubes and other electronic elements.

It is a further object of this invention to provide a circuit for detecting the coincidence or anticoincidence of either individual signals arriving on a pair of input lines or a pre-determined number of signal pairs.

A better understanding of this invention will be afforded by the following detailed description considered in connection with the accompanying drawing in which:

Figure 1 is a chart indicating the sequence in which pulses are or may be applied to the circuit of Figure 2.

Figure 2 is a block diagram of one embodiment of the subcombination of the invention.

Figure 3 is a block diagram of a part of the invention involving means to generate two signals (one from coincidence, the other from anticoincidence) in cooperation with either embodiment shown in Figure 2 or 4, and Figure 4 shows an alternative subcombination embodiment for the bit anticoincidence detector of Figure 2.

In Figure 1 the chart shows a typical pattern of pulse occurrences from two sources designated stream A and stream B. The occurrence of timing pulses is also included in the chart. In the example shown, the maximum pulse repetition rates may be at times $t_1$ for pulses of stream A, times $t_2$ for pulses of stream B and times $t_3$ for the timing pulses. In Figure 1 a typical case is shown wherein the repetition rates are one-half the maximum $t_1$ rate for stream A pulses and one-third the maximum $t_2$ rate for stream B pulses. The timing pulses occur at the maximum $t_3$ rate. The maximum repetition rate defines a detection period as indicated by legend in Figure 1. The pulse times of successive detection periods are identified by use of further subscripts, viz., $t_{1a}$, $t_{1b}$, etc.

With two possible signals occurring on each input signal line during any detection period, that is, a pulse or the absence of a pulse, it is evident that four input combinations are possible. For example, in Figure 1, the first detection period $a$ finds a pulse in each input stream; the second $b$, a pulse in neither stream; while there is a pulse in only one input stream during each of the third $c$ and fourth $d$ detection periods. For convenience, a pulse may be said to indicate the binary "1" and the absence of a pulse to indicate "0."

Referring now to Figure 2, there is shown an embodiment of this invention whereby anti-coincidence is detected between pulses of the same polarity arriving in stream A on signal line 10 at times $t_1$ and in stream B on signal line 12 at $t_2$. Considering first the case where pulses arrive on each signal input during one detection period, the pulse at time $t_{1a}$ in stream A will set flip-flop or memory means 14 to its "1" position and the pulse at $t_{2a}$ in stream B will return it to "0." The latter pulse will also be impressed upon but blocked by the gating or sensing means 16, because the duration of a pulse and consequently the transit time of a pulse through a gate is very short relative to the flip-flop transition time. Hence, a pulse applied simultaneously to a gate and to that gate's enabling flip-flop is transmitted through or blocked by that gate according to the state of the flip-flop which existed prior to its transition. The timing pulse at $t_{3a}$ incoming on line 18 is accordingly blocked at gating or sensing means 20 and incidentally leaves flip-flop 14 at "0." No pulse or signal appears on line 22 during this detection period $a$, but both lines 10 and 12 have carried pulses, and this then may be called a condition of coincidence.

Consider now the detection period $b$ wherein no pulse arrives on either input signal line at $t_{1b}$ or $t_{2b}$. Flip-flop 14 remains at its "0" position to enable gate 16 throughout the detection period since no pulse arrives on line 10 to shift flip-flop 14 to "1," and since no pulse arrives on line 12 to, in effect, pass through gate 16, no pulse will appear on line 22, which again indicates a condition of coincidence.

In detection period $c$, a pulse at $t_{1c}$ on line 10 sets flip-flop 14 to "1," nothing happens at time $t_{2c}$, and the timing pulse at $t_{3c}$ both resets flip-flop 14 to its "0" position and is transmitted through gate 20 to appear on line 22 to indicate a condition of anti-coincidence.

In detection period $d$, the pulse at $t_{2d}$ in stream B finds gate 16 enabled, since flip-flop 14 was left at its "0" position undisturbed at time $t_{1d}$, and, in effect, passes on to line 22 to show again the condition of anti-coincidence.

The embodiment of Figure 1 thus described is then a bit (binary digit) comparison circuit in that it detects, compares and indicates positively by an output signal on line 22, the condition of anti-coincidence only of signals on a pair of input lines, while the condition of coincidence is detected by the comparison of incoming signals indicated on line 22 by the absence of an output signal thereon. If it is desired to have both the condition of bit coincidence and anti-coincidence indicated positively by a potential, the output on line 22 may be connected to a means which conveniently can be termed a generating means, which comprises a flip-flop type multivibrator 24, gating means 26 and 28, and their respective input and output lines as shown in Figure 3. The flip-flop 24, which receives the output from the comparison circuit of Figure 2 (or Figure 4 as described hereinafter) would then be reset to its "0" position at each $t_1$ time by any desirable source of signals. Of course it will be readily seen from the following description of the operation of the circuitry in Figure 3 that the flip-flop 24 may be replaced by a one-shot or monostable multivibrator which automatically returns to its stable position—the "0" side—at the beginning of each detection period, time $t_1$.

A signal appearing on line 22 will shift or alter flip-flop 24 to its "1" position and enable gate 28 to pass, in effect, a probing pulse (derived from a suitable source and occurring regularly at time $t_1$) onto line 32. This pulse or signal then indicates the condition of anti-coincidence. However, if no signal appears on line 22 during a detection period—the condition showing coincidence—the flip-flop 24 will have remained in its "0" position and gate 26 remains enabled to pass the probing pulses onto line 30. The condition of coincidence is then shown positively by a signal upon line 30.

In the usual application of control or data handling systems, however, it is desired to test coincidence and/or anti-coincidence between words or messages containing a plurality of binary digits. In this case flip-flop 24 is reset at the end of each message pair by a source of suitably timed signals, and the anti-coincidence between any two corresponding bits in the message pair sets flip-flop 24 at its "1" position to remain there until reset at the beginning of the next message pair to be compared, allowing a signal to appear on line 32. Again, the non-occurrence of an anti-coincidence signal on line 22 allows a positive showing of coincidence on line 30. Probing signals may be applied to gates 26 and 28 at the end of each bit or the end of each message period, as may be desired.

A second embodiment of the comparison circuit of this invention in which the bit detector is somewhat simplified is shown in Figure 4. Each timing pulse at time $t_3$ on line 18 passes through the low forward resistance of semi-conductor diode 50 to reset the memory means or flip-flop 52. Signals or pulses in stream A set flip-flop 52 to its "1" position through diode 54, and signals or pulses in stream B trigger the flip-flop to its opposite state since they are applied to both its "0" side through diode 56 and its "1" side through diode 58. It will be readily seen that for any detection period, a pulse on both input signal lines causes flip-flop 52 to go through two transitions so that sensing or gating means 60 is disabled at time $t_3$ while a pair of "0" inputs leaves the flip-flop at "0" and also blocks the timing pulses at gate 60. However, if only one input signal line carries a pulse, that pulse will set flip-flop 52 to "1" so that the next timing pulse is transmitted through enabled gate 60 to indicate anti-coincidence on line 22. Hence, the circuit of Figure 4 is equivalent to the bit comparison detector of Figure 2 and so may be substituted therefor to give word or message coincidence indication; that is, the connection of line 22 of Figure 4 to the generating means shown in Figure 3 will operate to produce on output lines 30 or 32 an indication of bit and message coincidence or anti-coincidence, respectively, in the same manner as explained above for the comparison circuit of Figure 2.

It will be understood that the minimum time interval between the respective signals from streams A and B and other timing pulses is limited only by the times required for a given flip-flop circuit to operate.

The gates and flip-flops indicated in the boxes of Figures 2, 3 and 4 may take a number of well-known forms. For example, the two input gates and flip-flop shown and described in U.S. Patent 2,614,169, issued October 14, 1952 to A. A. Cohen et al., would be satisfactory. However, since the speed of operation is dependent upon the flip-flop settling time, it is important that a fast-action flip-flop be chosen.

Obviously, many variations in the circuit components and the manner of associating the same will suggest themselves to one skilled in the art without departing from the spirit and scope of the present invention. It is accordingly intended that the matter contained in the foregoing description and the accompanying drawings be interpreted as illustrative and not limitative since the appended claims define the invention.

What is claimed is:

1. A comparison circuit for detecting coincidence and anti-coincidence of non-overlapping signals from two sources during a detection period divided into a plurality of separate portions comprising bistable memory means coupled to one of the sources for registering in one of two states the occurrence or non-occurrence, respectively, of a signal therefrom during one portion of said detection period, means coupling the memory means to the other source and operative to alter the state of the memory means, if then alterable, upon the occurrence, if any, of a signal from the other of said two sources during another portion of said detection period, and sensing means responsive to the memory means at least during an interval extending from the time of possible occurrence of the signal from said other source to the end of said detection period for providing an output signal when only one signal from either one but not both of said two sources occurs during a detection period.

2. A comparison circuit as in claim 1 wherein said means coupling the memory means to the other source includes means for shifting the memory means in response to a signal from said other source regardless of the state of the memory means.

3. A comparison circuit as in claim 1 wherein said means coupling the memory means to the other source includes means for shifting the memory means in response to a signal from said other source only if the state of the memory means has been previously shifted within said detection period by the signal from said one of the two sources.

4. A comparison circuit as in claim 1 wherein said sensing means comprises two gating means each responsive to said memory means for determining the two states thereof respectively, only one of the gating means being coupled to said other source of signals.

5. A comparison circuit as in claim 1 wherein said sensing means comprises single gating means responsive to said memory means for determining the state thereof, wherein the memory means includes two inputs and wherein said coupling means includes means coupling said other source to both inputs of the memory means for altering the state of the memory means upon the occurrence if any of a signal from the other of said two sources.

6. A comparison circuit for detecting the comparative occurrence of non-overlapping signals from two sources during a detection period divided into a plurality of separate portions comprising bistable memory means coupled to one of the sources for registering in one of two states the occurrence or non-occurrence, respectively, of a signal therefrom during a first portion of said detection period means coupling the memory means to the other source and operative to alter the state of the memory means if then alterable upon the occurrence if any of a signal from the other of said two sources during a second portion of said detection period, means connecting a source of regularly recurring signals to said memory means for defining said detection period, one of said recurring signals occurring during a third portion of said detection period, sensing means responsive to the state of the memory means at least during an interval extending from the time of possible occurrence of the signal from said other source to the end of said detection period to determine said comparative occurrence, and means connecting said source of regularly recurring signals to the sensing means for passing at least one of the regularly recurring signals when said memory means is operated during a detection period by either but only one of said two sources of signals.

7. A comparison circuit as in claim 6 wherein said sensing means comprises two gating means each responsive to said memory means for determining said comparison, one of the gating means being connected to said other source of signals, and the other gating means being connected to said source of regularly recurring signals.

8. A comparison circuit as in claim 6 wherein said sensing means comprises single gating means responsive to said memory means for determining the state thereof and connected to the source of said regularly recurring signals for passing these regular signals when said memory means is operated during a detection period by only one of said two sources of signals, wherein the memory means includes two inputs and wherein said coupling means includes means coupling said other source to both inputs of the memory means for altering the state of the memory means upon the occurrence if any of a signal from the other of said two sources.

9. A comparison circuit for detecting the comparative occurrence of non-overlapping signals from two sources during a detection period divided into a plurality of separate portions comprising bistable memory means coupled to one of the sources for registering in one of two states, the occurrence or non-occurrence, respectively, of a signal therefrom during a first portion of said detection period, means coupling the memory means to the other source and operative if the memory means has been operated previously by a signal from said one source to alter the state of the memory means upon the occurrence if any of a signal from the other of said two sources during a second portion of said detection period, means connecting a source of regularly recurring signals to said memory means for defining said detection period, one of said recurring signals occurring during a third portion of said detection period, two gating means each responsive to said memory means for determining said comparative occurrence, one of the gating means being connected to said other source of signals, and the other gating means being connected to said regularly recurring signals.

10. A comparison circuit for detecting the comparative occurrence of non-overlapping signals from two sources during a detection period divided into a plurality of separate portions comprising bistable memory means coupled to one of the sources for registering in one of two states the occurrence or non-occurrence, respectively, if any of a signal therefrom during a first portion of said detection period, means coupling the memory means to the other source and operative to alter the state of the memory means upon the occurrence if any of a signal from the other of said two sources during a second portion of said detection period, means connecting a source of regularly recurring signals to said memory means for defining said detection period, one of said recurring signals occurring during a third portion of said detection period, and single gating means responsive to said memory means for determining the state thereof and connected to the source of said regularly recurring signals for passing these regular signals when the memory means is operated during a detection period by only one of said two sources of signals.

11. A comparison circuit as in claim 1 wherein said sensing means includes a connection from a source of signals recurring regularly in a third portion of said detection period to said memory means for defining the detection period.

12. An anticoincidence detection circuit comprising bistable memory means having two inputs, means for coupling a first signal to the first input of said memory means, means for coupling a second signal to at least the second input of said memory means, gating means coupled to the output of said memory means, means for coupling timing pulses to the second input of said memory means and simultaneously to said gating means, the time between said timing pulses being divided into first and second portions, said first signal when occurring being present during said first portion and causing said memory means to be in a first of its states, said second signal when occurring being present during said second portion, each timing pulse marking the end of a detection period and operating to set said memory means to its second state if not already therein, said gating means providing an output if either one but not both of said first and second signals occurred during their respective time poritons within a detection period.

13. A circuit as in claim 12 wherein the gating means includes two gates respectively coupled to the two outputs of said bistable memory means, the gate coupled to the memory means output corresponding to the first signal input being also coupled to said timing pulses and the gate coupled to the memory means output corresponding to the second input being coupled to the input coupling means for the second input signal.

14. A circuit as in claim 12 wherein said gating means is a single gate coupled to the memory means output corresponding to the first signal input, said means for coupling the second signal to at least the second input of the memory means also including means for coupling the second signal to the first input of said memory means.

References Cited in the file of this patent

UNITED STATES PATENTS

| | | |
|---|---|---|
| 2,596,199 | Bennett | May 13, 1952 |
| 2,614,169 | Cohen | Oct. 14, 1952 |
| 2,636,133 | Hussey | Apr. 21, 1953 |
| 2,694,146 | Fairstein | Nov. 9, 1954 |
| 2,698,427 | Steele | Dec. 28, 1954 |
| 2,700,504 | Thomas | Jan. 25, 1955 |
| 2,709,747 | Gordon et al. | May 31, 1955 |
| 2,715,997 | Hill | Aug. 23, 1955 |
| 2,723,080 | Curtis | Nov. 8, 1955 |
| 2,760,064 | Bell | Aug. 21, 1956 |
| 2,808,203 | Geyer et al. | Oct. 1, 1957 |
| 2,866,092 | Raynsford | Dec. 23, 1958 |